US012540565B2

(12) United States Patent
Kubec et al.

(10) Patent No.: US 12,540,565 B2
(45) Date of Patent: Feb. 3, 2026

(54) TURBOMACHINE WITH UNITARY HOUSING MEMBER HAVING CHAMBER WITH PLURALITY OF INTERNAL BRACES

(71) Applicant: Garrett Transportation I Inc., Torrance, CA (US)

(72) Inventors: Jiri Kubec, Brno (CZ); Michal Bieronski, Slapanice (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/173,936

(22) Filed: Feb. 24, 2023

(65) Prior Publication Data

US 2024/0287916 A1 Aug. 29, 2024

(51) Int. Cl.
*F01D 25/24* (2006.01)

(52) U.S. Cl.
CPC .......... *F01D 25/24* (2013.01); *F05D 2220/40* (2013.01); *F05D 2230/31* (2013.01); *F05D 2240/14* (2013.01)

(58) Field of Classification Search
CPC .. F01D 25/24; F05D 2220/40; F05D 2230/31; F05D 2240/14
See application file for complete search history.

(56) References Cited

U.S. PATENT DOCUMENTS

| | | | |
|---|---|---|---|
| 6,032,466 A | 3/2000 | Woollenweber et al. | |
| 9,599,149 B2 * | 3/2017 | Ryu | F16C 27/02 |
| 10,215,085 B2 * | 2/2019 | Yamashita | F04D 27/004 |
| 2004/0112052 A1 * | 6/2004 | Koch | F01D 17/165 |
| | | | 60/602 |
| 2005/0210875 A1 * | 9/2005 | Larue | F16C 17/042 |
| | | | 60/602 |
| 2008/0087018 A1 * | 4/2008 | Woollenweber | F16C 19/546 |
| | | | 60/605.1 |
| 2012/0014782 A1 * | 1/2012 | Petitjean | F01D 25/14 |
| | | | 415/170.1 |
| 2012/0282084 A1 * | 11/2012 | Boening | F04D 29/624 |
| | | | 415/182.1 |
| 2016/0215785 A1 * | 7/2016 | Begin | F04D 25/024 |
| 2016/0215815 A1 * | 7/2016 | Ryu | F16C 27/02 |

(Continued)

FOREIGN PATENT DOCUMENTS

EP 2886808 B1 8/2020

*Primary Examiner* — Nathaniel E Wiehe
*Assistant Examiner* — Aye S Htay
(74) *Attorney, Agent, or Firm* — BelayIP (57) ABSTRACT

A turbomachine includes a rotating group supported for rotation about an axis. The turbomachine includes a housing member that is unitary and that at least partly houses the rotating group. The housing member includes an outer radial portion and an inner radial portion that extend arcuately about the axis. Furthermore, the housing member includes a chamber defined between the outer radial portion and the inner radial portion in a radial direction with respect to the axis. The chamber is closed off at one axial end by a first axial portion of the housing member. The chamber is closed off at an opposite axial end by a second axial portion of the housing member. The housing member includes a brace that extends across the chamber between at least two of the outer radial portion, the inner radial portion, the first axial portion, and the second axial portion.

20 Claims, 7 Drawing Sheets

(56) References Cited

U.S. PATENT DOCUMENTS

2019/0234237 A1\* 8/2019 Kitamura ................ F01D 25/24
2020/0300115 A1\* 9/2020 Aurahs .................. F01D 5/085
2021/0025405 A1\* 1/2021 Kobielski ............. F04D 29/056
2022/0275809 A1 9/2022 Kobielski et al.

\* cited by examiner

TURBOMACHINE WITH UNITARY HOUSING MEMBER HAVING CHAMBER WITH PLURALITY OF INTERNAL BRACES

TECHNICAL FIELD

The present disclosure generally relates to a turbomachine and, more particularly, relates to a turbocharger with a unitary housing member having a fluid chamber that is supported by a plurality of internal braces.

BACKGROUND

Various turbomachines are provided for a number of applications. For example, turbochargers, superchargers, electric-motor-assisted fluid compressor devices, etc. may be used for transferring energy between a rotor of the turbomachine and a fluid flowing therethrough.

However, conventional turbomachines suffer from various deficiencies. For example, the housing that houses the rotor may be undesirably bulky and/or heavy. Also, there may be problems associated with providing sufficient lubrication to the rotating group for some turbomachines. Also, significant heat may be generated during operation, and a cooling system may be incorporated; however, the cooling system may increase the bulk, weight, and/or complexity of the turbomachine. Moreover, manufacture and assembly of the housing may be expensive, time consuming, and inefficient.

Accordingly, it is desirable to provide a turbomachine with an improved housing. For example, it is desirable to provide a turbomachine housing that is relatively lightweight and compact while also being highly robust. It is also desirable to provide a turbomachine housing that efficiently and effectively provides lubricant and/or coolant flow for improved operations. Moreover, it is desirable to provide a turbomachine that may be manufactured and assembled in an efficient manner. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a rotating group supported for rotation about an axis. The turbomachine includes a housing member that is unitary and that at least partly houses the rotating group. The housing member includes an outer radial portion and an inner radial portion that extend arcuately about the axis. Furthermore, the housing member includes a chamber defined between the outer radial portion and the inner radial portion in a radial direction with respect to the axis. The chamber is closed off at one axial end by a first axial portion of the housing member. The chamber is closed off at an opposite axial end by a second axial portion of the housing member. The housing member includes a brace that extends across the chamber between at least two of the outer radial portion, the inner radial portion, the first axial portion, and the second axial portion.

In another embodiment, a method of manufacturing is disclosed that includes forming a housing member of a turbomachine. The housing member is configured to at least partially house a rotating group supported for rotation about an axis. The method includes forming the housing member as a unitary member to include an outer radial portion and an inner radial portion that extend arcuately about the axis. Moreover, the method includes forming the housing member to include a chamber defined between the outer radial portion and the inner radial portion in a radial direction with respect to the axis. The chamber is closed off at one axial end by a first axial portion of the housing member. The chamber is closed off at an opposite axial end by a second axial portion of the housing member. The method includes forming the housing member to include a brace that extends across the chamber between at least two of the outer radial portion, the inner radial portion, the first axial portion, and the second axial portion.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved turbomachine, such as an improved turbocharger. The turbomachine of the present disclosure may include a housing member that houses at least part of the rotating group (i.e., the rotor). The housing member may be unitary, one-piece, and monolithic. The housing member may define a number of openings, pockets, chambers, etc. The housing member may be a hollow structure to define one or more chambers substantially closed off at a first axial end, a second axial end, and an outer radial wall thereof. At least some features of the housing member may be included for receiving a fluid (e.g., a coolant fluid, a lubricant, etc.). Furthermore, some of these features may be included for reducing weight of the housing member.

In some embodiments, the housing member may include at least one fluid chamber. The chamber may be a lubricant chamber, for example, for lubricating rolling element bearings in some embodiments. In some embodiments, the chamber may also be a coolant chamber for cooling the turbomachine. In some embodiments, the housing member may define two or more fluid chambers, such as a first chamber for lubricant and a second chamber for coolant.

At least one fluid chamber may be defined, at least, by an outer radial portion, an inner radial portion, a first axial portion, and a second axial portion. The housing member may also include at least one fluid inlet and at least one fluid outlet for the chamber. As mentioned, the housing member may be unitary, one-piece, and monolithic, and the chamber may be largely self-contained therein.

Moreover, the housing member may include a plurality of braces, struts, ribs, or other reinforcement members. At one of these structures may extend through one of the fluid chambers and connect to the walls defining outer boundaries of the chamber. The structures may also be tailored for reinforcing the walls of the chamber. Accordingly, the housing member may have lightweight and compact construction, and the housing member may also be highly robust.

In some embodiments, the housing member may be manufactured in a highly efficient manufacturing process. For example, in some embodiments, the housing member may be additively manufactured. Several manufacturing techniques are discussed herein as example embodiments of the present disclosure, such as binder jet printing, metal stereographic lithography (MSL), metal injection molding (MIM), compression bonding, three-dimensional printing, direct metal laser sintering (DMLS), and selective laser melting (SLM). However, other techniques may be employed without departing from the scope of the present disclosure.

Utilizing additive manufacturing technology may allow more complex geometries to be produced. For example, a plurality of elongate brace structures may be included within the chambers. Some may run along the inner surfaces of the chamber wall(s) to increase stiffness and strength. Some of the elongate brace structures may be supported at both longitudinal ends between two of the chamber walls. Thus, internal support structures may be formed with highly optimized geometry that allows for material thickness reduction, reduction in weight, and other advantages.

Figure 1:
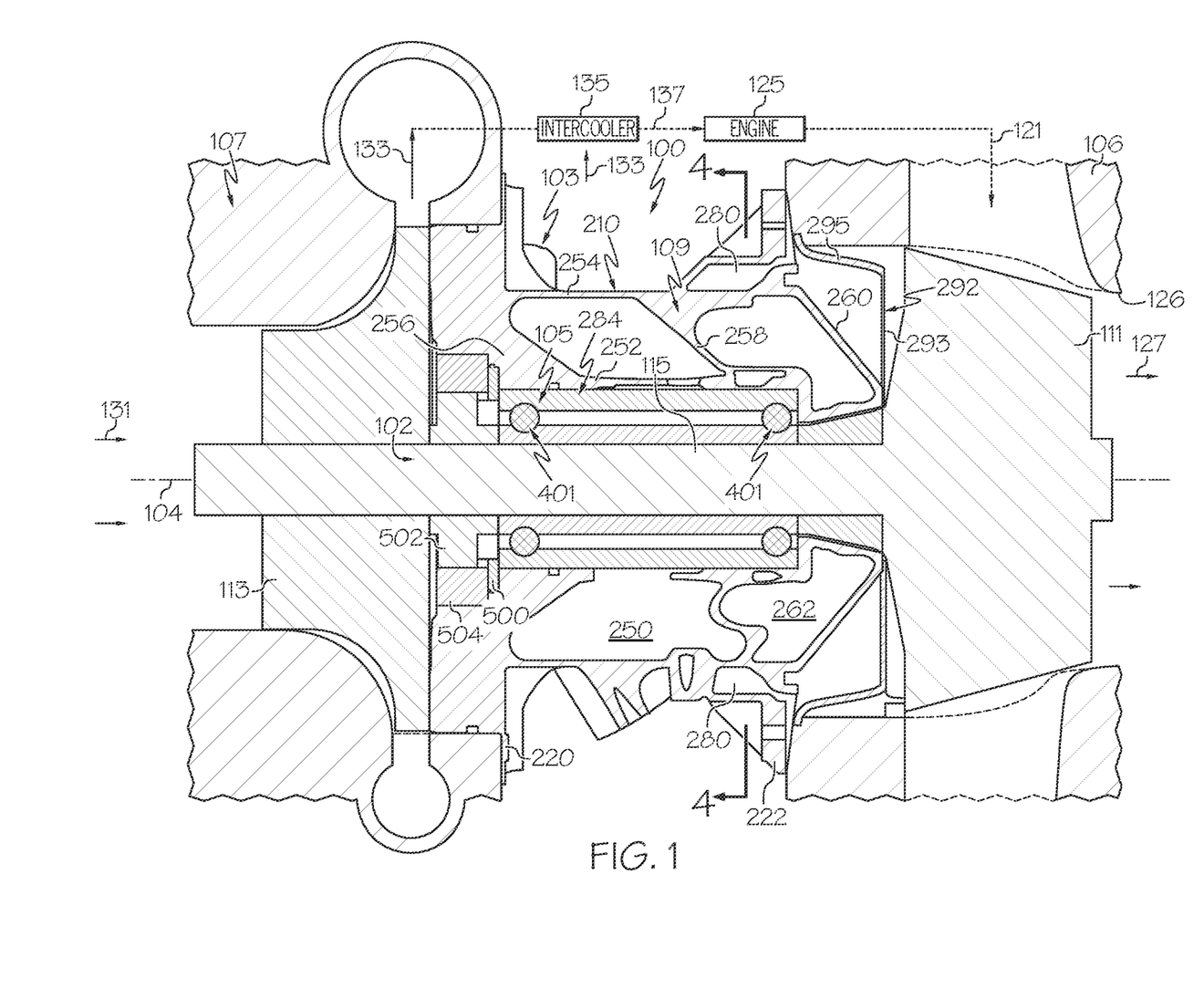
FIG. 1 is a schematic illustration of an engine system with a turbocharger according to example embodiments of the present disclosure.

FIG. 1 is a schematic view of an example turbomachine, such as a turbocharger 100 that is incorporated within an engine system 101 and that includes one or more features of the present disclosure. It will be appreciated that the turbocharger 100 could be another turbomachine (e.g., a supercharger, a turbine-less compressor device, etc.) in additional embodiments of the present disclosure. Furthermore, the turbomachine of the present disclosure may be incorporated into a number of systems other than an engine system without departing from the scope of the present disclosure. For example, the turbomachine of the present disclosure may be incorporated within a fuel cell system for compressing air that is fed to a fuel cell stack, or the turbomachine may be incorporated within another system without departing from the scope of the present disclosure.

Generally, the turbocharger 100 may include a housing 103 and a rotating group 102. A bearing system 105 may be included for supporting the rotating group 102 for rotation about an axis 104 within the housing 103. The bearing system 105 may include one or more bearings of any suitable type, such as a rolling element bearings as will be discussed.

As shown in the illustrated embodiment, the housing 103 may include a turbine housing 106, a compressor housing 107, and an intermediate housing 109. The intermediate housing 109 may be disposed axially between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the intermediate housing 109, to connect the turbine wheel 111 to the compressor wheel 113. Accordingly, the turbine wheel 111 and the compressor wheel 113 may rotate together as a unit about the axis 104.

The turbine housing 106 and the turbine wheel 111 cooperate to form a turbine stage (i.e., turbine section) configured to circumferentially receive a high-pressure and high-temperature exhaust gas stream 121 from an engine, specifically, from an exhaust manifold of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor stage (i.e., compressor section). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold of the internal combustion engine 125, or alternatively, into a subsequent-stage, in-series compressor.

The intermediate housing 109 may include an outer housing member 210, which is illustrated FIGS. 1-3, 5, and 6. The outer profile of the outer housing member 210 may be generally cylindrical, hollow, tubular, and/or spool-shaped. The outer housing member 210 may be substantially centered about the axis 104. The outer housing member 210 may include a first end 212 and a second end 214, and the axis 104 may pass between the first and second ends 212, 214. Also, the housing member 210 may include a central opening 216 (i.e., a central bore opening, a central bore, center through-opening) that extends along the axis 104 between the first and second end 212, 214. The central opening 216 may be open at both the first end 212 and the second end 214.

Figure 4:
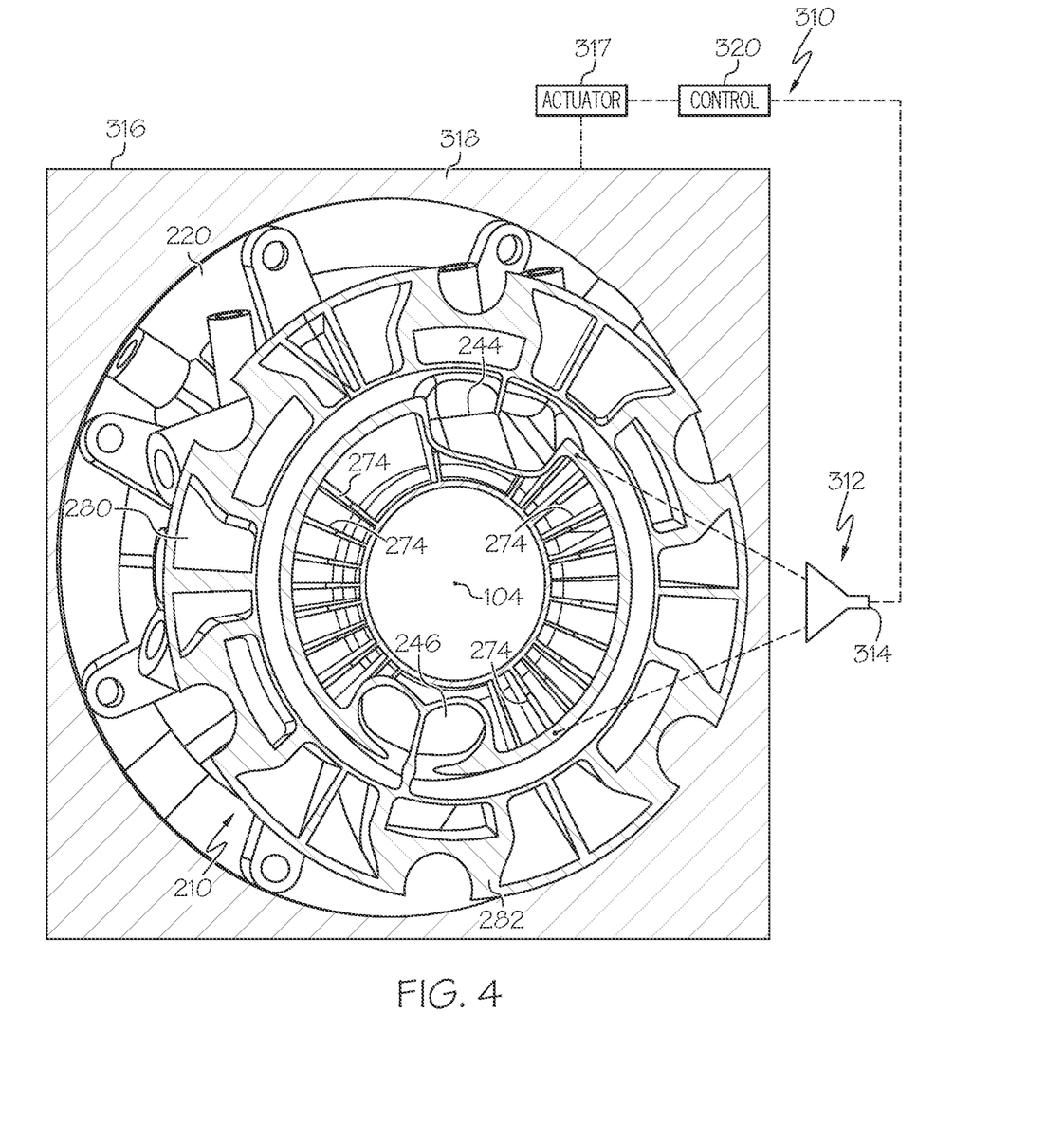
FIG. 4 is a schematic view of a manufacturing system for forming the outer housing member of FIG. 2 according to example embodiments, wherein the outer housing member is shown sectioned along the plane 4-4 indicated in FIG. 1.

In some embodiments, the outer housing member 210 may be unitary, one-piece, and monolithic. For example, the outer housing member 210 may be an additively manufactured article (as illustrated, for example, in FIG. 4) and constructed as a unitary, one-piece, monolithic part. In other words, the outer housing member 210 may be constructed in an additive manufacturing process as represented in FIG. 4 and as will be discussed in detail below.

Figure 3:
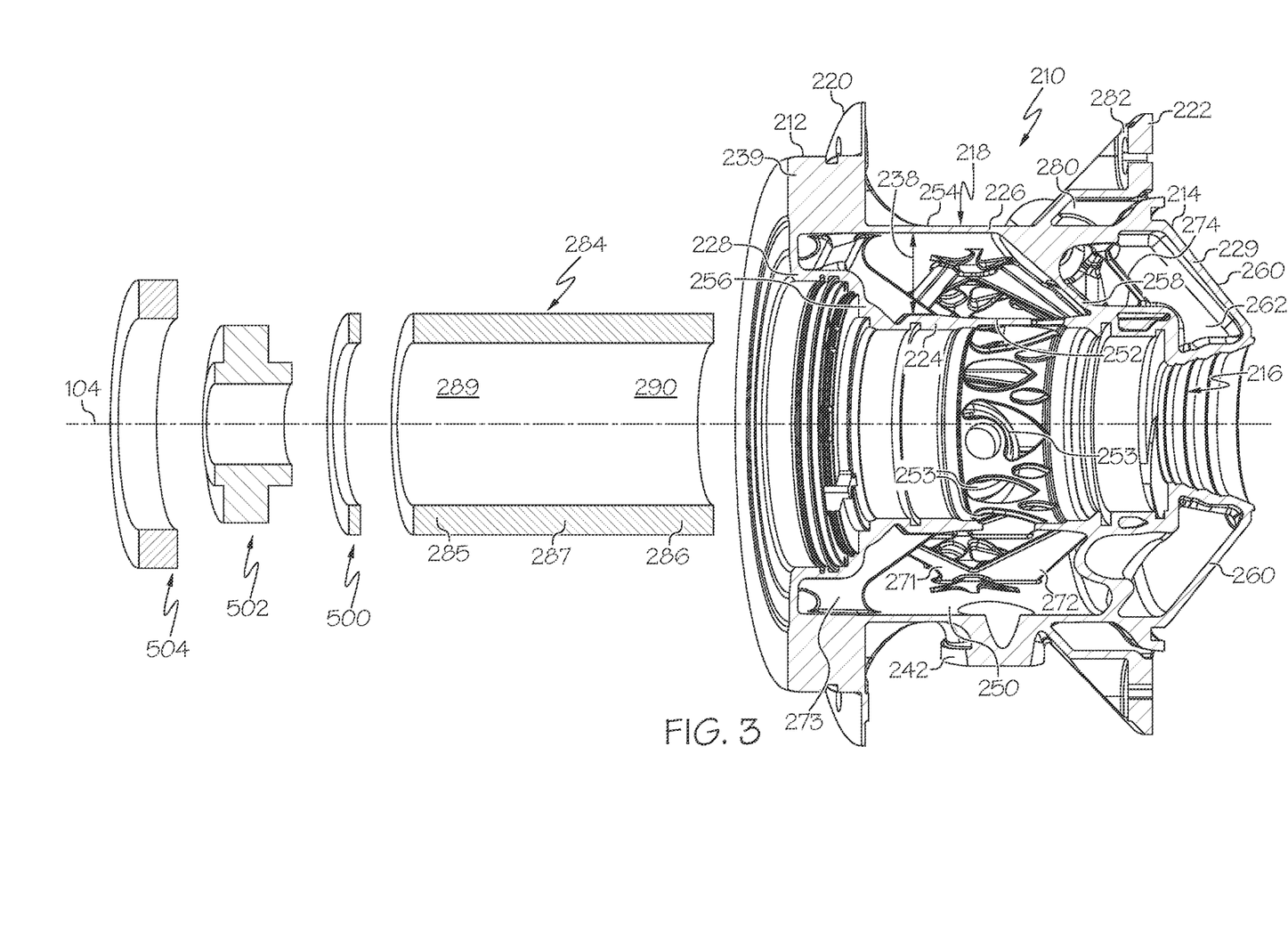
FIG. 3 is an exploded view of portions of the turbocharger, including the outer housing member of FIG. 2 according to example embodiments of the present disclosure.

As shown in FIG. 3, the outer housing member 210 may include a shell body 218. The shell body 218 may be annular, may be substantially centered about the axis 104, and may extend between the first and the second ends 212, 214. The shell body 218 may be relatively thin-walled and substantially hollow (i.e., a majority of the shell body 218 may be hollow). Accordingly, the shell body 218 may generally include an inner radial portion 224 and an outer radial portion 226 with at least one space defined radially therebetween. The outer radial portion 226 may be separated at a radial distance 238 from the inner radial portion 224. The shell body 218 may also include a first axial portion 228 and a second axial portion 229 (FIG. 3) that extend at least partly in the radial direction. The first axial portion 228 may be included at and/or may define the first end 212. The second axial portion 229 may be included at and/or may define the second end 214. One or more fluid chambers may be defined between the inner radial portion 224 and the outer radial portion 226. At least one fluid chamber may be defined by the first axial portion 228 in some embodiments. Furthermore, at least one fluid chamber may be defined by the second axial portion 229.

In some embodiments, the outer housing member 210 may include a first fluid chamber 250. The first fluid chamber 250 may be an internal, self-contained annular chamber within the outer housing member 210 with at least one fluid inlet and at least one fluid outlet. The first fluid chamber 250 may be defined on a radially inboard side by an inner radial wall 252 of the inner radial portion 224. The inner radial wall 252 may be annular and may extend along the axis 104. The inner radial wall 252 may have a relatively small wall thickness. The inner radial wall 252 may also include a plurality of through-holes or openings 253 of various shapes and that are arranged circumferentially about the axis 104. The inner radial wall 252 may also define the central opening 216 of the outer housing member 210.

The first fluid chamber 250 may be defined on a radially outboard side by an outer radial wall 254 of the outer radial portion 226. The outer radial wall 254 may be annular and may extend along the axis 104. The outer radial wall 254 may have a relatively small wall thickness.

The first end 212 of the outer housing member 210 may include and/or may be defined by a first end ring 239. The first end ring 239 may be annular and may be centered on the axis 104. The end ring 239 may extend outward radially from the outer radial wall 254, and the first flange 220 may extend outward radially therefrom.

The outer housing member 210 may also include a first axial wall 256. The first axial wall 256 may extend radially inward from the first end ring 239. The first axial wall 256 may also be canted inward along the axis 104 and may be generally frusto-conic. Portions of the first axial wall 256 may be inset from the first end 212 along the axis 104. The first axial wall 256 may extend radially between the outer radial wall 254 and the inner radial wall 252 to define an axial boundary of the first fluid chamber 250. An inner diameter portion of the first axial wall 256 may define the central opening 216 at the first end 212. The first axial wall 256 may include one or more grooves, threads, recesses, or other similar features that are defined on the inner diameter surface thereof.

The outer housing member 210 may further include an internal wall 258. The internal wall 258 may extend radially from the outer radial wall 254, proximate the second end 214. The internal wall 258 may extend radially between the outer radial wall 254 and the inner radial wall 252, and the internal wall 258 may extend about the axis 104 in the circumferential direction so as to define another axial boundary of the first fluid chamber 250. The internal wall 258 may be canted toward the second end 214 as it extends away from the outer radial wall 254 and may be generally frusto-conic.

The outer housing member 210 may further include a second axial wall 260. The second axial wall 260 may extend radially between the outer radial wall 254 and the inner radial wall 252, and the second axial wall 260 may extend about the axis 104 in the circumferential direction. The second axial wall 260 may be canted outward, making the second end 214 generally frusto-conic and/or dome-shaped. The second axial wall 260 may also be spaced apart in the axial direction from the internal wall 258 such that the internal wall 258 and the second axial wall 260 cooperatively define the axial boundaries of a second fluid chamber 262. The second fluid chamber 262 may also be defined radially between the inner radial portion 224 and the outer radial portion 226 of the outer housing member 210.

The first fluid chamber 250 and the second fluid chamber 262 may be configured for receiving, directing, and containing flow of any suitable fluid. For example, in some embodiments, the first fluid chamber 250 may contain a lubricant for lubricating the bearing(s) 105, components of the rotating group 102, etc. Likewise, in some embodiments, the second fluid chamber 262 may contain a liquid coolant, which provides cooling for the turbine section and/or components proximate thereto.

Figure 5:
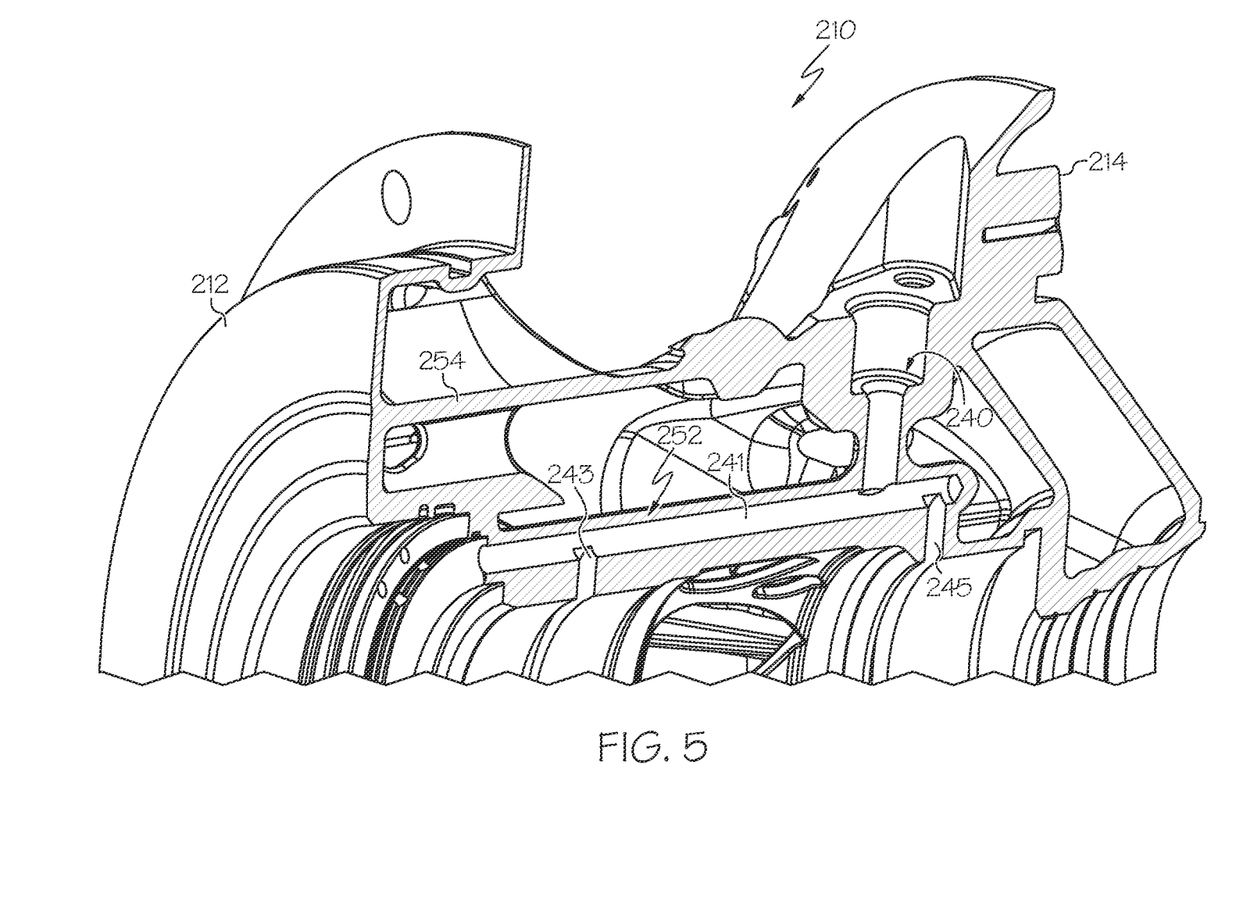
FIG. 5 is a front isometric section view of the outer housing member of FIG. 2.
Figure 6:
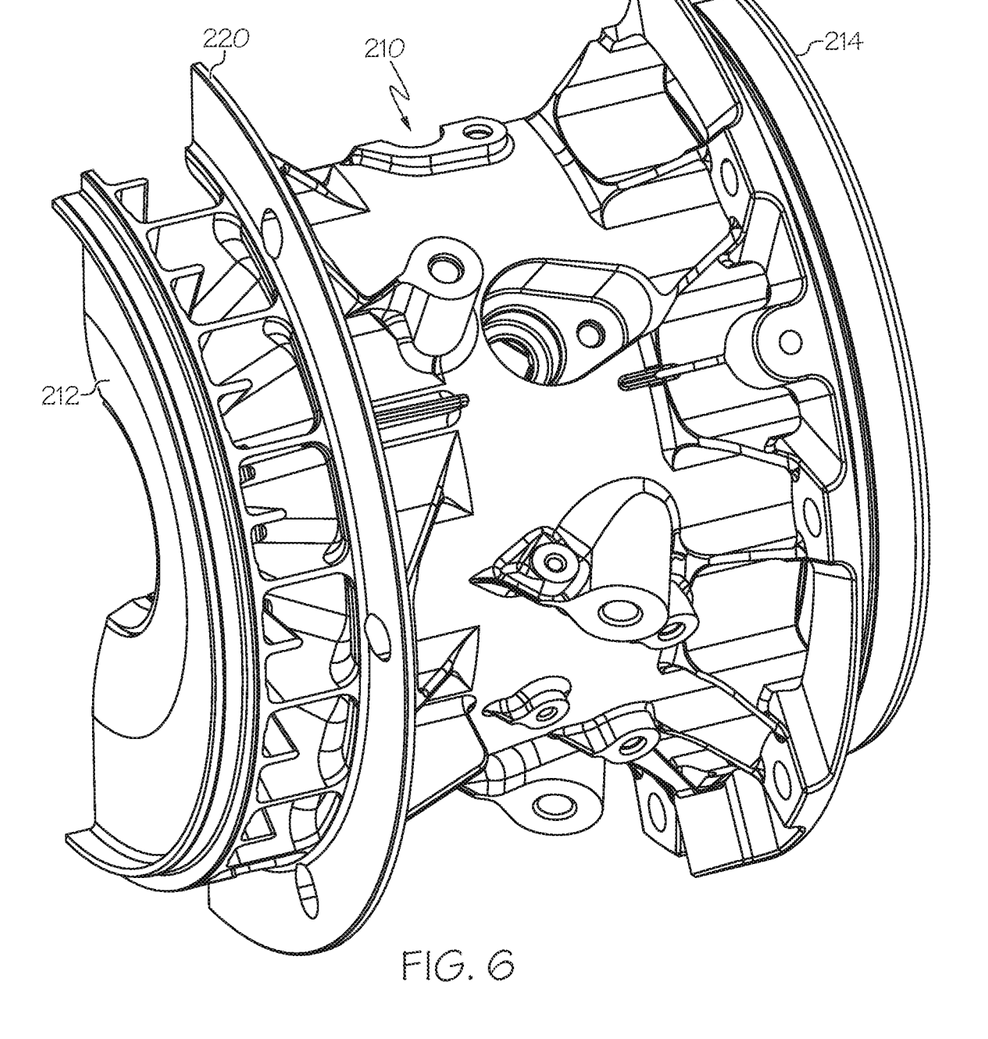
FIG. 6 is a back isometric view of the outer housing member of FIG. 5.

The outer housing member 210 may further include one or more fluid conduits (i.e., a fluid inlet and/or outlet) for the first fluid chamber 250. The inlet(s) and outlet(s) may be formed through the outer radial wall 254 in some embodiments. As shown in FIG. 5, for example, a first inlet 240 may be included proximate the second end 214. The first inlet 240 may extend radially through the outer radial wall 254 and may connect to a distribution passage 241 extending through the inner radial wall 252. The distribution passage 241 may be axially straight and may extend substantially parallel to the axis 104. The distribution passage 241 may extend between a first inner diameter groove 243 and a second inner diameter groove 245 of the central opening 216. The grooves 243, 245 may provide lubricant supply for the central opening 216, e.g., for lubricating the bearing system. Lubricant may flow along a flow path from the first end 212 of the central opening 216 and into the first fluid chamber 250. The outer housing member 210 may also include at least one first outlet 242 (FIG. 3) for the first fluid chamber 250. The first inlet 240 and the first outlet 242 may be disposed on opposite sides of the axis 104.

The outer housing member 210 may similarly include one or more second inlets 244 and one or more second outlets 246 (FIG. 4) for the second fluid chamber 262. The fluid inlets 244 and outlets 246 may be disposed on opposite sides of the axis 104.

The outer housing member 210 may further include a number of braces (i.e., struts, buttresses, ribs, etc.). For example, there may be a plurality of elongate first braces 271 and a plurality of elongate second braces 272. The first and second braces 271, 272 may be elongate, relatively flat, rib-shaped structures. The first and second braces 271, 272 may extend in the radial direction between the outer radial wall 254 and the inner radial wall 252. The first and second braces 271, 272 may also be angled so as to extend in the longitudinal direction along the axis 104 and in the radial direction between the outer and inner radial walls 252, 254. Also, the plurality of braces 271, 272 may be arranged and spaced apart in the circumferential direction. The braces 271, 272 may be arranged about the axis 104, and may radiate outward relative to the axis 104. The first and second braces 271, 272 may extend through the first fluid chamber 250. The longitudinal ends of the braces 271, 272 may be respectively attached to both the outer radial wall 254 and the inner radial wall 252. The side edges of the first and second braces 271, 272 may be spaced apart from the first axial wall 256 and the internal wall 258 such that fluid in the first fluid chamber 250 may flow around the side edges of the braces 271, 272.

As shown in FIG. 3, the plurality of first braces 271 may be angled relative to the axis 104. The first braces 271 may extend away from the first end 212 and toward the second end 214 as the first braces 271 extend radially outward from the inner radial wall 252 toward the outer radial wall 254. The plurality of second braces 272 may be angled in the opposite direction. Specifically, the second braces 272 may extend away from the second end 214 and toward the first end 212 as the second braces 272 extend radially outward from the inner radial wall 252 and toward the outer radial wall 254. The braces 271, 272 may extend longitudinally along the axis 104 and radially between the inner and outer radial walls 252, 254, thereby providing robust support to the outer housing member 210. In addition, as will be discussed, the outer housing member 210 may be additively manufactured. In some embodiments, the outer housing member 210 may be manufactured layer-by-layer in a direction that is substantially parallel to the axis 104. The braces 271, 272 may be configured to provide support, for example, during such manufacture.

Furthermore, as shown in FIG. 3, the outer housing member 210 may include a plurality of third braces 273. The third braces 273 may be elongate, relatively flat, rib-shaped structures. The third braces may be disposed proximate the first end 212 and may extend radially and axially within the first end ring 239. Portions of at least one third brace 273 may run along and may be connected to the first axial wall 256 such that the third brace(s) 273 are angled toward the second end 214 as the third brace(s) 273 extend radially inward within the first fluid chamber 250.

The outer housing member 210 may also include a plurality of fourth braces 274. The fourth braces 274 may be elongate, relatively flat, rib-shaped structures. The fourth braces 274 may be disposed proximate the second end 214 and may extend radially between the inner radial wall 252 and the outer radial wall 254 and within the second fluid chamber 262. There may be a plurality of fourth braces 274 spaced about the axis 104 as shown in FIG. 4.

The first, second, third, and fourth braces 271, 272, 273, 274 may strengthen, stiffen, bolster, or otherwise provide support for the outer housing member 210. Moreover, the outer housing member 210 may include a number of other ribs, stiffeners, braces, or other supportive structures for providing support thereto. The braces 271, 272, 273, 274 may also be included proximate the fluid inlets 240, 244 and/or fluid outlets 242, 246 for the first fluid chamber 250 and/or second fluid chamber 262. The braces 271, 272, 273, 274 may provide support between the inner and outer radial walls 252, 254. Furthermore, the braces 271, 272, 273, 274 may be formed as a unit with the inner and outer radial walls 252, 254 and may be tailored (e.g., tailored size and/or location) to provide support at specific areas of the outer housing member 210. Accordingly, the wall thickness of the inner and/or outer radial walls 252, 254 may be relatively thin and lightweight; however, the outer housing member 210 may be highly robust.

As shown in FIGS. 1-4, the outer housing member 210 may include a first flange 220 that is disposed proximate the first end 212. The first flange 220 may be annular and may extend outward radially from the shell body 218 and from the axis 104. The first flange 220 may include a plurality of fastener seats 276 for fastening the outer housing member 210 to other structures (e.g., the compressor housing 107). The first flange 220 may also include arcuate webs 278 that extend circumferentially between neighboring seats 276. The first flange 220 may be thicker at the seats 276 (as measured along the axis 104) as compared to the webs 278 to strengthen the seats 276 while keeping the first flange 220 lightweight.

Figure 2:
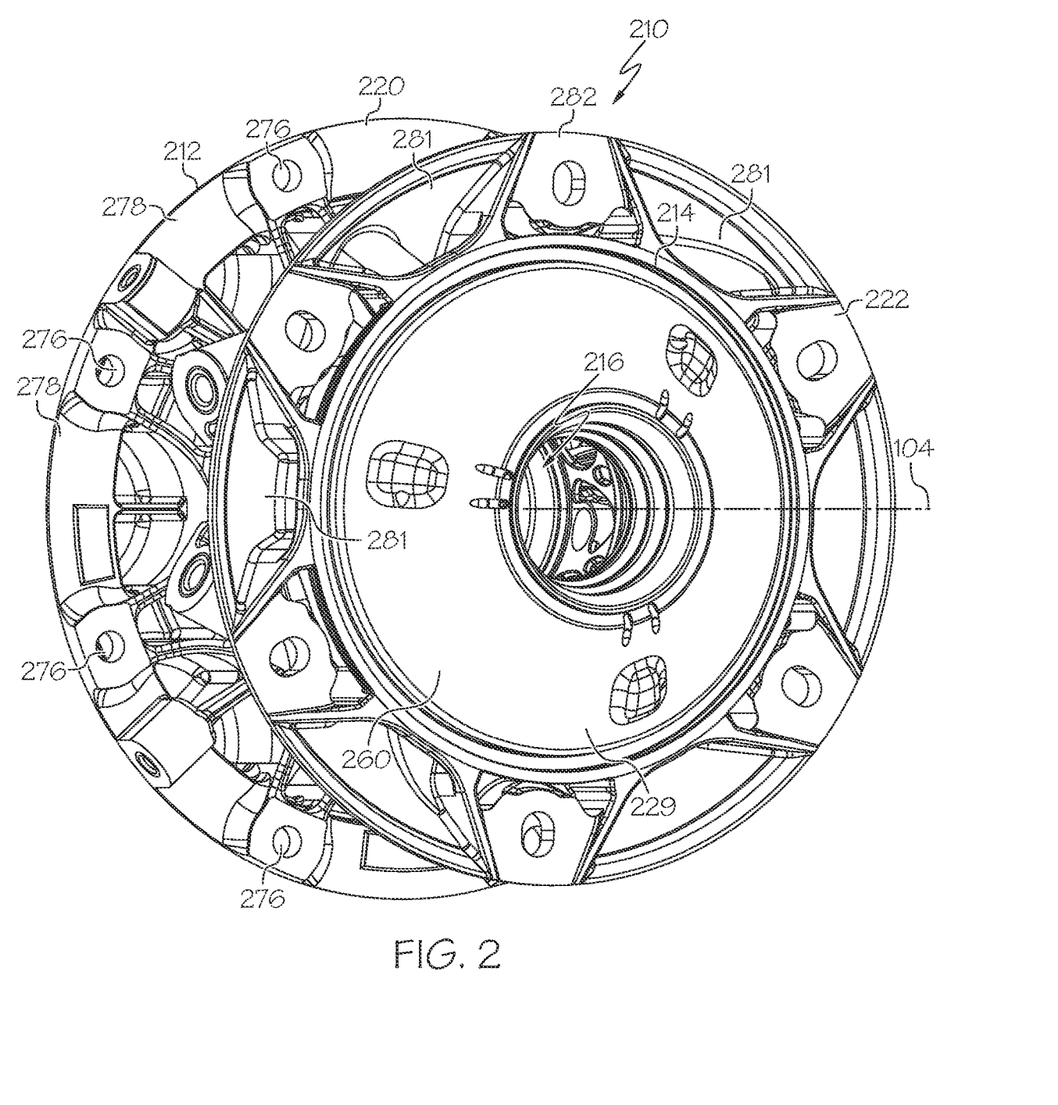
FIG. 2 is an isometric view of an outer housing member of the turbocharger of FIG. 1 according to example embodiments of the present disclosure.

The outer housing member 210 may also include a second flange 222 that is disposed proximate the second end 214. The second flange 222 may be annular. The second flange 222 may be attached to the outer radial portion 226 of the outer housing member 210 and may extend outward radially therefrom. The second flange 222 may include a plurality of fastener seats 282 for fastening the outer housing member 210 to other structures (e.g., the turbine housing 106). The second flange 222 may also include a plurality of pockets, such as one or more first pockets 280 (FIG. 3) and one or more second pockets 281 (FIG. 2). The pockets 280, 281 may have a variety of shapes and may extend axially from the second end 214 toward the first end 212. The first pocket 280 may be annular and may be disposed radially inward from the second flange 222. The first pocket 280 may also be open to the second end 214. The outer housing member 210 is shown during formation of the second flange 222 in FIG. 4, and the pocket 280 are shown according to example embodiments. As shown, the pockets 281 may be positioned around the seats 282 for reducing weight of the second flange 222.

As shown in FIG. 3, the outer housing member 210 may include a bearing support insert 284 (i.e., bearing cartridge). The bearing support insert 284 may be generally cylindrical with a first end 285, a second end 286, and an intermediate portion 287 extending axially therebetween. The first end 285 may include a first inner diameter surface 289, and the second end 286 may include a second inner diameter surface 290. The first and second inner diameter surfaces 289, 290 may be precision-formed (e.g., ground) to relatively high tolerances. The bearing support insert 284 may be received within the central opening 216 of the outer housing member 210.

The bearing system 105 may include at least one rolling element bearing 401 as shown in FIG. 1. There may be a plurality of rolling elements, respective race members, and/or other bearing components radially disposed between and supported between the inner diameter surfaces 289, 290 and the shaft 115.

Additionally, as shown in FIG. 3, the turbocharger 100 may include a thrust plate 500, a seal member 502, and a lock nut 504. The thrust plate 500 may be annular and may abut against the first end 285 of the bearing support insert 284 to provide axial support. The seal member 502 may be disposed axially between the lock nut 504 and the thrust plate 500. The seal member 502 may create a fluid seal between the compressor stage and the bearing support insert 284 due to pressure at the back of the compressor wheel 113 during operation. The lock nut 504 may threadably and/or other otherwise attach to the inner diameter surfaces of the first end ring 239 and to retain the stack-up of the seal member 502, the thrust plate 500, and the bearing support insert 284.

As shown in FIG. 1, the turbocharger 100 may also include a heat shield member 292. The heat shield member 292 may comprise and/or include a front plate 293 that is annular and that extends radially and circumferentially and a footing 295 that is annular and that is centered about the axis 104. The footing 295 may be supported proximate to the second end 214 of the housing member 210 as shown in FIG. 1 such that the front plate 293 is interposed between the turbine wheel 111 and the outer housing member 210. The heat shield member 292 may include and/or be made from a thermally insulative material, such as a ceramic material, a composite material, etc. Heat from the turbine wheel 111 and/or other parts of the turbine stage may be shielded from the intermediate housing 109, the housing member 210, the bearing system 105, etc. because the heat shield member 292 is interposed therebetween. The heat shield member 292 may also define one or more air pockets on one or more axial sides that provide thermal insulation.

General operations of the turbocharger 100 are set forth above in reference to FIG. 1. Lubricant may be circulated along a lubrication flow path from the first inlet 240, along distribution passage 241, to the grooves 243, to the space between the outer housing 210, through the intermediate portion 287 and into the central opening 216 to lubricate the bearing system 105. Some of this lubricant may flow axially through in the central opening 216 toward the first end 212 and the second end 214 of the outer housing member 210, eventually flowing to the first chamber 250 proximate the first outlet 242. The remainder of the lubricant in the central opening 216 may flow through the openings 253 and into the first chamber 250 to drain from the first outlet 242.

There may be a lubricant/air mixture in the central opening 216 and first chamber 250. In some embodiments, a vacuum pump may be used at the outlet 242 to assist lubricant flow and avoid excessive lubricant flow toward the compressor and turbine sides of the housing member 210.

Furthermore, coolant may be circulated through the second fluid chamber 262 to provide cooling between the turbine stage and the intermediate housing 109, the bearing system 201, etc. Coolant may be delivered from the inlets 244 to flow through the second fluid chamber 262 and may exit via the outlets 246.

The outer housing member 210 may be formed using a manufacturing system, such as the manufacturing system 310 represented schematically in FIG. 4. In some embodiments, the system 310 may be configured as an additive manufacturing system and may include an additive manufacturing device 312. The additive manufacturing device 312 may be a 3-D printer and/or include components that are common to a 3-D printer. However, it will be appreciated that the manufacturing system 310 may be configured differently without departing from the scope of the present disclosure.

The additive manufacturing device 312 may be used to additively manufacture (e.g., 3-D print) the outer housing member 210. The outer housing member 210 may be additively manufactured using any type of additive manufacturing process which utilizes layer-by-layer construction, including, but not limited to: selective laser melting; direct metal deposition; direct metal laser sintering (DMLS); direct metal laser melting; electron beam melting; electron beam wire melting; micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; laser engineered net shaping; Direct Metal Electron Beam Fusion (DMEBF); and other powder consolidation techniques.

In one particular exemplary embodiment, direct metal laser sintering (DMLS) may be used to manufacture the outer housing member 210. DMLS is a commercially available laser-based rapid prototyping and tooling process by which complex parts may be directly produced by precision melting and solidification of metal powder (the "build material") into successive layers of larger structures, each layer corresponding to a cross-sectional layer of the outer housing member 210.

The additive manufacturing device 312 includes an emitter 314. The emitter 314 may emit a laser, an electron beam, or other energy toward a support bed 316. The support bed 316 may support a collection of material 318. The support bed 316 may be connected to an actuator 317. The actuator 317 may selectively change elevation of the support bed 316. The manufacturing system 310 may also include a control system 320 with a processor, etc. for controlling operations of the actuator 317, the emitter 314, and other components of the additive manufacturing device 312.

During formation of the outer housing member 210, the control system 320 may control the actuator 317 and/or the emitter 314 to selectively apply energy to predetermined areas of the bed 316. The applied energy may fuse the material 318 in those areas. A layer of the outer housing member 210 may be so formed, and the outer housing member 210 may be formed layer by successive layer in this fashion.

In some embodiments, the majority of the outer housing member 210 may be formed via additive manufacturing, wherein some features are formed using other methods. For example, in some embodiments, the structures for the fluid inlets 240, 244 may be additively manufactured. Then, holes for these conduits may be machined (e.g., drilled) into the structures.

The outer housing member 210 may, in some embodiments, be built and formed progressively in a direction (i.e., along a build axis) that is parallel to the axis 104. The outer housing member 210 may be substantially self-supporting for this additive manufacturing process. More specifically, the braces 271, 272, 273, 274 may provide support for the surrounding features to be additively manufactured. The outer housing member 210 may be constructed such that the walls, braces, struts, surfaces, etc. do not exceed a predetermined build angle relative to the build axis 104. In some embodiments, a feature may be built at a maximum of forty degrees (40°) away from the build axis (e.g., at most forty degrees (40°) away from the axis 104). The first pocket 280 (FIG. 3) and surrounding frusto-conic flange 222 may also allow additive manufacturing without extra supporting structures. Accordingly, the outer housing member 210 may be self-supporting during the additive manufacturing process. Furthermore, some features, such as the generally frusto-conic axial wall 256, internal wall 258, and/or second axial wall 260 may be so-shaped relative to the axis 104 to be self-supporting during the additive manufacturing process.

The material 318 used for additive manufacturing may be selected according to a variety of characteristics. The material 318 may be chosen according to its material properties. The material 318 may be chosen according to manufacturing considerations. In some embodiments, the material 318 may be an aluminum or aluminum alloy material. The material 318 may be an alloy containing primarily aluminum and some magnesium. In additional embodiments, the material 318 may include titanium. Accordingly, the material 318 may exhibit desirable material characteristics. The material

318 may exhibit high tensile strength (e.g., UTS 520 Mpa), desirable density (e.g., 2.67 g/cm3), and/or other characteristics.

Utilizing additive manufacturing technology allows more complex geometries to be produced. This leads to highly optimized geometry with internal support structures that allowed material thickness reduction, thereby allowing reduction in weight.

Figure 7:
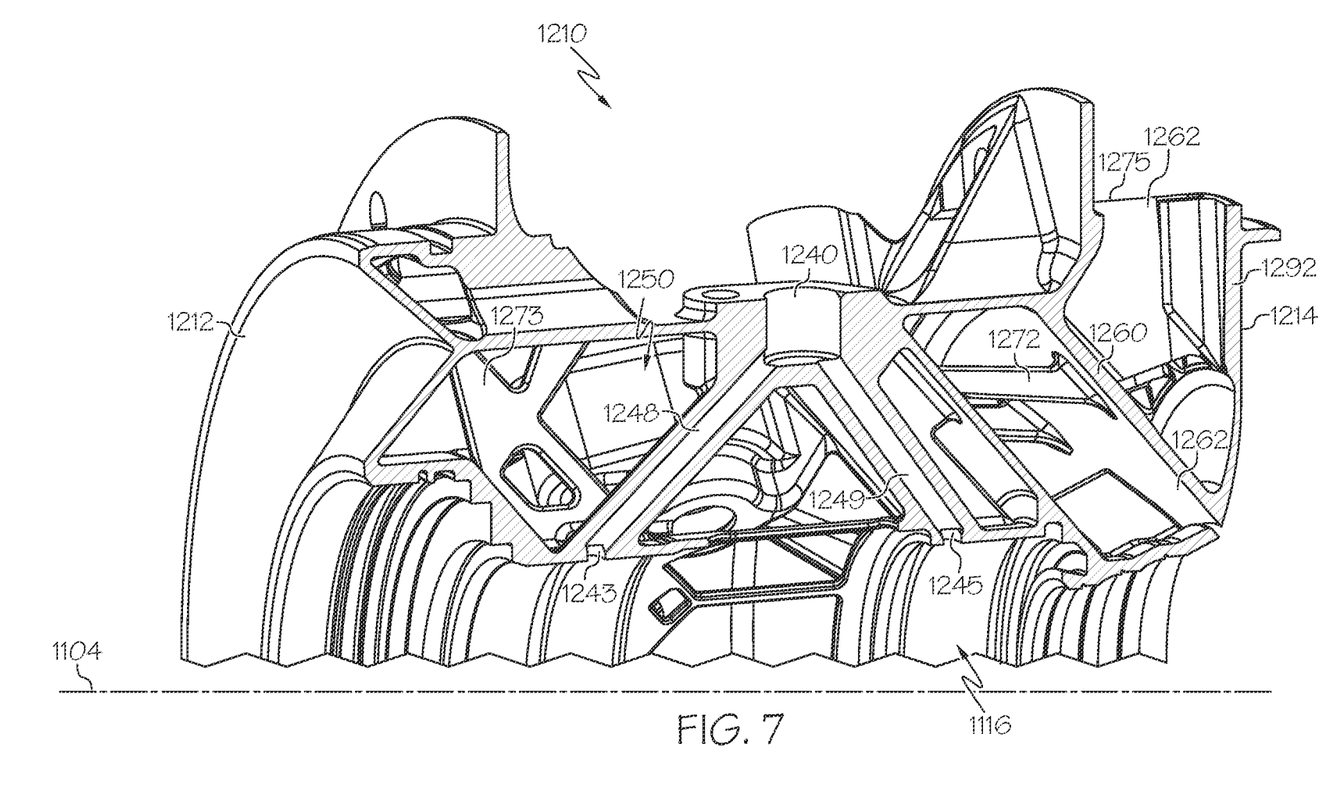
FIG. 7 is a front isometric section view of the outer housing member according to additional example embodiments of the present disclosure.

Referring now to FIG. 7, additional embodiments of the outer housing member 1210 are illustrated. The outer housing member 1210 may be substantially similar to the embodiments discussed above except as noted below. Features that correspond to those of FIGS. 1-6 are indicated by corresponding reference numbers increased by 1000.

As shown, the first inlet 1240 may extend radially and normal to the axis 1104. The outer housing member 1210 may include branch distribution passages 1248, 1249, which are straight passages that extend at an angle relative to the axis 1104. A first branch distribution passage 1248 extends radially and axially toward the first end 1212 to fluidly connect to the first groove 1243, and the second branch distribution passage 1249 extends radially and axially toward the second end 1214 the second groove 1245.

Similar to the embodiments of FIG. 4, the outer housing member 1210 may be a unitary, monolithic, one-piece part. The outer housing member 1210 may be formed using an additive manufacturing process and, in some embodiments, using the manufacturing system 310 of FIG. 4. In some embodiments, the material 318 used to form the outer housing member 1210 may include titanium.

In some embodiments, the outer housing member 1210 may be additively manufactured layer-by-layer so as to include the first and second branch distribution passages 1248, 1249. Because they extend radially and axially with respect to the build direction (i.e., along the axis 1104), the structure defining the passages 1248, 1249 may be self-supporting during the additive manufacturing process. Furthermore, in some embodiments, the inlet 1240 may be formed by removing material (e.g., by drilling, milling, or other cutting processes) from the additively-manufactured part. Specifically, a single inlet 1240 may be drilled into the additively manufactured outer housing member 1210 to define the inlet 1240 and to fluidly connect to the additively-manufactured passages 1248, 1249. Accordingly, the manufacturing process may be highly efficient and cost-effective. Furthermore, the passages 1248, 1249 may be included and the outer housing member 1210 may still exhibit high radial stiffness. The radial stiffness of the outer housing member 1210 may be highly uniform about the axis 1104, in part, due to the configuration of the passages 1248, 1249, thereby benefiting rotordynamics of the turbomachine.

The outer housing member 1210 may include the inlet 1240, the passages 1248, 1249 for providing a flow of lubrication to the central opening 1116, to the bearing system (not shown), etc. The lubricant may flow to the chamber 1250 and exit the outer housing member 1210 via an outlet in the outer housing member 1210, similar to the outlet 242 of the embodiments of FIGS. 1-6.

The outer housing member 1210 may, therefore, include channels, openings, passageways, chambers, etc. for lubricant flow. The outer housing member 1210 may also include one or more other openings that are included for weight savings, for providing thermally insulating air pockets, etc. However, in contrast to the embodiments of FIGS. 1-6, the outer housing member 1210 may be configured as a "coolant-less" or "water-less" outer housing member 1210. In other words, whereas the outer housing member 210 includes the second fluid chamber 262 for providing a coolant flow, the outer housing member 1210 of FIG. 7 may not be configured for such coolant flow.

As shown, the second end 1214 of the outer housing member 1210 may include the heat shield 1292. The heat shield 1292 may be integrally connected to the second axial wall 1260 to define the second chamber 1262. The second chamber 1262 may include at least one opening 1275 that is open in the radial direction and that may dissipate heat from the turbine section to thereby protect the outer housing member 1210, the bearing system, etc.

Furthermore, the outer housing member 1210 may include the second chamber 1262. The second chamber 1262 may be a substantially closed chamber (i.e., without a coolant fluid inlet or outlet). The second chamber 1262 may reduce weight of the outer housing member 1210 and may provide thermal insulation from the turbine section.

Moreover, the outer housing member 1210 may include the first chamber 1250. The first chamber 1250 may include the lubricant inlet 1240 and a corresponding lubricant outlet (not shown), but the first chamber 1250 may be otherwise closed (i.e., without a coolant fluid inlet or outlet). The first chamber 1250 may reduce weight of the outer housing member 1210.

Additionally, the outer housing member 1210 may include braces 1272, 1273 and/or additional braces that extend through the first chamber 1250 and/or the first chamber 1252 to provide reinforcement and support. The braces 1272, 1273 may support these loads and provide stiffness, for example, at the first end 1212 and second end 1214 of the outer housing 1120. These braces may also provide support for the outer housing member 1210 during an additive manufacturing process as discussed above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
   a turbine section;
   a compressor section spaced apart from the turbine section along an axis;
   a bearing section disposed between the turbine section and the compressor section along the axis;
   a rotating group that extends along the axis between the turbine section, the compressor section, and the bearing section and that is supported by the bearing section for rotation about the axis;
   the bearing section including a housing member that is unitary and that at least partly houses the rotating group;
   the housing member including a hollow shell body having an outer radial portion and an inner radial portion that extend arcuately about the axis, the hollow shell body having a first axial portion and a second axial portion, the outer radial portion and the inner radial portion spaced apart radially with respect to the axis;

a majority of the hollow shell body being hollow with a chamber defined within the hollow shell body radially between the outer radial portion and the inner radial portion, the chamber closed off at one axial end thereof by the first axial portion and at an opposite axial end thereof by the second axial portion;

the housing member including a plurality of braces that radiate with respect to the axis and that are spaced apart and disconnected from neighboring ones of the plurality of braces in a circumferential direction about the axis between the outer radial portion and the inner radial portion, the plurality of braces being elongate to extend across the chamber between at least two of the outer radial portion, the inner radial portion, the first axial portion, and the second axial portion;

the inner radial portion defining therein a central opening of the housing member, the central opening centered on the axis and extending along the axis through the inner radial portion of the housing member;

the housing member including a plurality of openings extending radially through the inner radial portion and fluidly connecting the chamber and the central opening; and the housing member including a first terminal surface that attaches to a compressor housing of the compressor section and the housing member including a second terminal surface that attaches to a turbine housing of the turbine section.

2. The turbomachine of claim 1, further comprising a bearing support insert that is received in the housing member, the bearing support insert including an inner diameter surface configured to support a rolling element bearing of the turbomachine.

3. The turbomachine of claim 1, wherein the rotating group includes a turbine wheel; and further comprising a heat shield member that is integrally connected to the second axial portion to be interposed between the turbine wheel and the second axial portion with respect to the axis.

4. The turbomachine of claim 1, wherein the plurality of braces are elongated to extend radially across the chamber to connect to the outer radial portion and the inner radial portion.

5. The turbomachine of claim 4, wherein the plurality of braces are elongated to extend at an angle with respect to the axis both radially and axially across the chamber.

6. The turbomachine of claim 5, wherein the plurality of braces includes a first brace member and a second brace member, the first brace member elongated to extend axially along the axis, and the second brace member elongated to extend axially along the axis in an opposite direction from the first brace member.

7. The turbomachine of claim 1, wherein the chamber is a first chamber, and the shell body defines a second chamber that is defined between the outer radial portion and the inner radial portion, wherein the first chamber and the second chamber are separated by the second axial portion, and wherein the second chamber is closed off by a third axial portion of the hollow shell body.

8. The turbomachine of claim 7, wherein the plurality of braces is a first plurality of braces that extend through the first chamber; and further comprising a second plurality of braces that are spaced apart about the axis and that are elongate to extend across the second chamber.

9. The turbomachine of claim 1, wherein the housing member includes a fluid inlet to the chamber and a fluid outlet from the chamber, the chamber configured to receive a fluid flow from the fluid inlet to the fluid outlet;

wherein the inner radial portion defines a central opening of the housing member, the central opening centered on the axis, extending along the axis, and extending through the housing member; and wherein the housing member includes at least one distribution passage, the at least one distribution passage fluidly connecting the fluid inlet to the central opening proximate the first end and the fluid inlet to the central opening proximate the second end.

10. The turbomachine of claim 9, wherein the at least one distribution passage includes a first distribution passage fluidly connecting the fluid inlet to the central opening proximate the first end, the at least one distribution passage includes a second distribution passage fluidly connecting the fluid inlet to the central opening proximate the second end; and wherein the first distribution passage and the second distribution passage extend radially and axially through the housing.

11. A method of manufacturing comprising:

forming a housing member of a turbomachine, including forming the housing member as a unitary member to include a hollow shell body having an outer radial portion and an inner radial portion that extend arcuately about an axis, the hollow shell body having a first axial portion and a second axial portion;

forming the outer radial portion to be spaced apart radially from the inner radial portion with respect to the axis with a majority of the hollow shell body being hollow and including a chamber defined radially between the outer radial portion and the inner radial portion, the chamber closed off at the first end by the first axial portion and at the second end by the second axial portion;

forming the housing member to include a plurality of braces that radiate with respect to the axis and that are spaced apart and disconnected from neighboring ones of the plurality of braces about the axis between the outer radial portion and the inner radial portion, the plurality of braces being and that are elongate to extend across the chamber between at least two of the outer radial portion, the inner radial portion, the first axial portion, and the second axial portion;

forming the housing member with the inner radial portion defining therein a central opening of the housing member, the central opening centered on the axis and extending along the axis through the inner radial portion of the housing member;

forming the housing member to include a plurality of openings extending radially through the inner radial portion and fluidly connecting the chamber and the central opening;

forming the housing member to include first terminal surface and a second terminal surface; and attaching the first terminal surface to a compressor housing, attaching the second terminal surface to a turbine housing with the housing member disposed along the axis between the compressor housing and the turbine housing.

12. The method of claim 11, further comprising inserting a bearing support insert into the housing member, the bearing support insert including an inner diameter surface configured to support a rolling element bearing of the turbomachine.

13. The method of claim 11, wherein forming the housing member includes forming a heat shield that is integrally attached to the second axial portion.

14. The method of claim 11, wherein the plurality of braces are elongated to extend radially across the chamber to connect to the outer radial portion and the inner radial portion.

15. The method of claim 14, wherein the plurality of braces are elongated to extend at an angle with respect to the axis both radially and axially across the chamber.

16. The method of claim 11, wherein the chamber is a first chamber, and further comprising forming the shell body to include a second chamber that is defined between the outer radial portion and the inner radial portion, wherein the first chamber and the second chamber are separated by the second axial portion, and wherein the second chamber is closed off by a third axial portion of the hollow shell body.

17. The method of claim 16, wherein the plurality of braces is a plurality of first braces that extend through the first chamber; and further comprising a plurality of second braces that are spaced apart about the axis and that are elongate to extend across the second chamber.

18. The method of claim 11, wherein forming the housing member includes additively manufacturing the housing member including forming the housing member progressively along a build axis that is parallel to the axis.

19. The turbomachine of claim 1, wherein the chamber is annular and extends about the axis in a circumferential direction.

20. A turbomachine comprising:
a turbine section;
a compressor section spaced apart from the turbine section along an axis;
a bearing section disposed between the turbine section and the compressor section along the axis;
a rotating group that extends along the axis between the turbine section, the compressor section, and the bearing section;
the bearing section including a rolling element bearing that is housed within a housing member, the housing member being unitary, the rolling element bearing supporting the rotating group for rotation about the axis;
the housing member including a hollow shell body having an outer radial portion and an inner radial portion that extend arcuately about the axis, the hollow shell body having a first axial portion and a second axial portion, the outer radial portion and the inner radial portion spaced apart radially with respect to the axis;
a majority of the hollow shell body being hollow with a chamber defined within the hollow shell body radially between the outer radial portion and the inner radial portion, the chamber closed off at one axial end thereof by the first axial portion and at an opposite axial end thereof by the second axial portion, the chamber extending continuously about the axis in a circumferential direction;
the housing member including a plurality of braces that radiate with respect to the axis and that are spaced apart and disconnected from neighboring ones of the plurality of braces in a circumferential direction about the axis between the outer radial portion and the inner radial portion, the plurality of braces being elongate to extend across the chamber between the outer radial portion and the inner radial portion;
the inner radial portion defining therein a central opening of the housing member, the central opening centered on the axis and extending along the axis through the inner radial portion of the housing member;
the housing member including a plurality of openings extending radially through the inner radial portion and fluidly connecting the chamber and the central opening;
the housing member including a first terminal surface that attaches to a compressor housing of the compressor section and the housing member including a second terminal surface that attaches to a turbine housing of the turbine section; and
the plurality of braces including a first brace member and a second brace member, the first brace member elongated at an angle relative to the axis to extend radially and to extend axially along the axis, and the second brace member elongated at another angle relative to the axis to extend axially along the axis in an opposite direction from the first brace member.

* * * * *